United States Patent
Wada et al.

(10) Patent No.: US 9,478,357 B2
(45) Date of Patent: Oct. 25, 2016

(54) MULTILAYER CERAMIC ELECTRONIC COMPONENT

(71) Applicant: MURATA MANUFACTURING CO., LTD., Nagaokakyo-Shi, Kyoto-Fu (JP)

(72) Inventors: Hiroyuki Wada, Nagaokakyo (JP); Yosuke Hirata, Nagaokakyo (JP); Takashi Hiramatsu, Nagaokakyo (JP); Yoshito Saito, Nagaokakyo (JP); Hideaki Tsuji, Nagaokakyo (JP); Hiroyuki Ukai, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 210 days.

(21) Appl. No.: 14/549,795

(22) Filed: Nov. 21, 2014

(65) Prior Publication Data
US 2015/0077897 A1 Mar. 19, 2015

Related U.S. Application Data

(63) Continuation of application No. PCT/JP2013/062553, filed on Apr. 30, 2013.

(30) Foreign Application Priority Data

May 24, 2012 (JP) ................................ 2012-118242

(51) Int. Cl.
H01G 4/30 (2006.01)
H01G 4/258 (2006.01)
(Continued)

(52) U.S. Cl.
CPC .............. *H01G 4/258* (2013.01); *H01C 7/102* (2013.01); *H01C 7/1006* (2013.01); *H01C 7/18* (2013.01); *H01G 4/012* (2013.01); *H01G 4/30* (2013.01); *H01G 4/12* (2013.01)

(58) Field of Classification Search
CPC ........................................................ H01G 4/00
USPC ....................................................... 361/301.4
See application file for complete search history.

(56) References Cited

U.S. PATENT DOCUMENTS 6,366,444 B1 4/2002 Yagi
2012/0019982 A1* 1/2012 Sasaki .................... H01G 4/002
361/321.1

(Continued)

FOREIGN PATENT DOCUMENTS

JP         08148371 A * 6/1996
JP      2000-277369 A   10/2000

(Continued)

OTHER PUBLICATIONS

PCT/JP/2013/062553 Written Opinion dated Jun. 6, 2013.
(Continued)

*Primary Examiner* — Eric Thomas
(74) *Attorney, Agent, or Firm* — Arent Fox LLP

(57) ABSTRACT

A multilayer ceramic electronic component that has a multilayer portion having an outer layer portion adjacent region including an area in contact with an outer layer portion that forms a thermal-shock absorbing portion that includes curved ceramic layers and inner electrode layers smoothly varying in thickness from point to point. A region to an inside of the thermal-shock absorbing portion forms a normal multilayer portion that includes ceramic layers with less curvature than the ceramic layers in the thermal-shock absorbing portion and inner electrode layers with less variation in thickness from point to point in a direction along a principal surface of the outer layer portion than the inner electrode layers in the thermal-shock absorbing portion.

15 Claims, 6 Drawing Sheets

(51) Int. Cl.
*H01C 7/10* (2006.01)
*H01C 7/102* (2006.01)
*H01C 7/18* (2006.01)
*H01G 4/012* (2006.01)
*H01G 4/12* (2006.01)

(56) References Cited

U.S. PATENT DOCUMENTS

| | | | | |
|---|---|---|---|---|
| 2012/0327555 | A1* | 12/2012 | Ahn | H01G 4/30 361/321.1 |
| 2014/0116902 | A1* | 5/2014 | Dressel | A47K 17/00 206/207 |
| 2015/0179343 | A1* | 6/2015 | Tsutsumi | B32B 37/10 361/301.4 |
| 2016/0020029 | A1* | 1/2016 | Hirao | H01G 4/012 361/301.4 |

FOREIGN PATENT DOCUMENTS

| | | | |
|---|---|---|---|
| JP | 2003045740 A | * | 2/2003 |
| JP | 2004-095687 A | | 3/2004 |
| JP | 2005-136146 A | | 5/2005 |
| JP | 2007123389 A | | 5/2007 |
| JP | 2007-158266 A | | 6/2007 |

OTHER PUBLICATIONS

PCT/JP/2013/062553 ISR dated Jun. 6, 2013.

* cited by examiner

US 9,478,357 B2

MULTILAYER CERAMIC ELECTRONIC COMPONENT

CROSS REFERENCE TO RELATED APPLICATIONS

The present application is a continuation of International application No. PCT/JP2013/062553, filed Apr. 30, 2013, which claims priority to Japanese Patent Application No. 2012-118242, filed May 24, 2012, the entire contents of each of which are incorporated herein by reference.

FIELD OF THE INVENTION

The present invention relates to a multilayer ceramic electronic component that includes a multilayer portion having a plurality of stacked ceramic layers and inner electrode layers each interposed between adjacent ceramic layers, and an outer layer portion having no inner electrode layers, formed by one or more ceramic layers, and disposed such that the multilayer portion is sandwiched from both principal surfaces.

BACKGROUND OF THE INVENTION

A chip-type multilayer ceramic capacitor is one of typical multilayer ceramic electronic components. With miniaturization and sophistication of electronic devices in recent years, there is more demand than ever before for small-size and large-capacity multilayer ceramic capacitors having a large electrostatic capacity per unit volume.

To realize small-size and large-capacity multilayer ceramic capacitors, it is generally required not only to reduce the thicknesses of ceramic layers and inner electrode layers, but also to increase the number of ceramic layers and inner electrode layers of a multilayer portion, that is, to achieve further multilayering.

However, the multilayering increases the ratio of inner electrode layers per unit volume of the multilayer ceramic capacitor. As a result, a difference in sintering shrinkage temperature between the ceramic layers and the inner electrode layers leads to an increased occurrence of delamination.

Moreover, a ceramic material forming the ceramic layers and a metal forming the inner electrode layer portion have different thermal expansion coefficients. This means that in a multilayer ceramic capacitor obtained through a sintering process, there is internal stress caused by the difference in thermal expansion coefficient. The internal stress increases as the ratio of inner electrode layers is increased by the multilayering described above. This may cause cracks to occur in response to thermal shock.

As a solution to the problems described above, a multilayer ceramic electronic component illustrated in FIGS. 8 and 9 has been proposed (see Patent Document 1). As illustrated, the multilayer ceramic electronic component includes a multilayer body 103 having ceramic layers 107 and inner electrode layers 105 and 106 alternately stacked, and outer electrodes 102 and 102 disposed on respective end portions of the multilayer body 103 and connected to the inner electrode layers 105 and 106. The inner electrode layers 105 and 106 contain first ceramic particles (not shown) having an average particle diameter less than or equal to an average particle diameter of conductor particles, and second ceramic particles 108 (see FIG. 9) having an average particle diameter greater than the thickness of the inner electrode layers 105 and 106.

Patent Document 1 states that since the invention disclosed in Patent Document 1 reduces the difference in thermal expansion coefficient between ceramic layers 107 and enhances bonding strength between them, it is possible to obtain a multilayer ceramic electronic component which is resistant to cracks and delamination in the multilayer body 103 because of its high resistance to thermal stress caused by, for example, heat shock that occurs when the multilayer ceramic electronic component is mounted on a circuit board and the outer electrodes 102 and 102 are soldered (see paragraph 0045 in Patent Document 1).

However, in the multilayer ceramic electronic component disclosed in Patent Document 1, the presence of the second ceramic particles having an average particle diameter greater than the thickness of the inner electrode layers 105 and 106 causes breaks in the inner electrode layers. If the multilayer ceramic electronic component is a multilayer ceramic capacitor, this leads to degradation of electrostatic capacity and failure to meet the demand for increased capacity.

A similar problem also applies to multilayer ceramic electronic components other than multilayer ceramic capacitors.

Patent Document 1: Japanese Unexamined Patent Application Publication No. 2000-277369

SUMMARY OF THE INVENTION

The present invention is made to solve the problems described above, and aims to provide a multilayer ceramic electronic component that has no performance degradation resulting from breaks in inner electrode layers, exhibits good resistance to thermal shock, and has high reliability.

To solve the problems described above, a multilayer ceramic electronic component of the present invention includes a multilayer portion having a plurality of stacked ceramic layers and inner electrode layers each interposed between adjacent ceramic layers, and an outer layer portion formed by one or more ceramic layers disposed such that the multilayer portion is sandwiched from directions along a stacking direction. In the multilayer portion, an outer layer portion adjacent region including an area in contact with the outer layer portion forms a thermal-shock absorbing portion that includes curved ceramic layers and inner electrode layers smoothly varying in thickness from point to point in a direction along a principal surface of the outer layer portion, and a region to an inside of the thermal-shock absorbing portion forms a normal multilayer portion that includes ceramic layers with less curvature than the ceramic layers in the thermal-shock absorbing portion and inner electrode layers with less variation in thickness from point to point in the direction along the principal surface of the outer layer portion than the inner electrode layers in the thermal-shock absorbing portion. In the thermal-shock absorbing portion, a CV of a thickness of any of the ceramic layers is 15% or less, a CV of a thickness of at least one of the inner electrode layers is 40% or more, and a CV of a center-to-center distance between any pair of adjacent ceramic layers is 40% or more, the center-to-center distance being a length of a straight line connecting points along the stacking direction of the multilayer portion, the points being located at respective centers of one and the other of the adjacent ceramic layers in a thickness direction.

It is preferable that, in the normal multilayer portion, a CV (coefficient of variation) of a thickness of any of the ceramic layers be 15% or less, a CV of a thickness of any of the inner electrode layers be 20% or less, and a CV of a center-to-center distance between any pair of adjacent ceramic layers be 20% or less, the center-to-center distance being a length of a straight line connecting points along the stacking direction of the multilayer portion, the points being located at respective centers of one and the other of the adjacent ceramic layers in the thickness direction.

With this configuration of the normal multilayer portion, it is possible to obtain a multilayer ceramic electronic component that has not only good thermal shock resistance based on the basic configuration (configuration of the thermal-shock absorbing portion) described above, but also has good electric characteristics based on the configuration in which the inner electrode layers and the ceramic layers in the normal multilayer portion are reliably stacked without distortion. This can make the present invention more effective.

The multilayer ceramic electronic component of the present invention is preferably a surface-mount multilayer ceramic capacitor.

Surface-mount multilayer ceramic capacitors, in particular, have a large number of layers to achieve compactness and high performance (large capacity). This may lead to increased occurrence of delamination caused by a difference in sintering shrinkage temperature between ceramic layers and inner electrode layers. Application of the present invention is of particular significance in that it makes it possible to provide a multilayer ceramic electronic component having improved resistance to thermal shock, a large electrostatic capacity despite its small size, and a high level of reliability.

In the multilayer portion of the multilayer ceramic electronic component according to the present invention, as described above, an outer layer portion adjacent region including an area in contact with the outer layer portion forms a thermal-shock absorbing portion, and a region to an inside of the thermal-shock absorbing portion forms a normal multilayer portion. The thermal-shock absorbing portion includes curved ceramic layers and inner electrode layers smoothly varying in thickness from point to point in a direction along a principal surface of the outer layer portion. The normal multilayer portion includes ceramic layers with less curvature than the ceramic layers in the thermal-shock absorbing portion and inner electrode layers with less variation in thickness from point to point in the direction along the principal surface of the outer layer portion than the inner electrode layers in the thermal-shock absorbing portion. In the thermal-shock absorbing portion, a CV of a thickness of any of the ceramic layers is 15% or less, a CV of a thickness of at least one of the inner electrode layers is 40% or more, and a CV of a center-to-center distance between any pair of adjacent ceramic layers is 40% or more. Since the requirements described above are satisfied, it is possible to provide a compact, high-performance, and reliable multilayer ceramic electronic component which is highly resistant to thermal shock and has a small size but a large electrostatic capacity when, for example, the multilayer ceramic electronic component is a multilayer ceramic capacitor.

That is, in the multilayer ceramic electronic component according to the present invention, (a) ceramic layers are curved, and (b) each inner electrode layer smoothly varies in thickness from point to point in the direction along the principal surface of the outer layer portion (i.e., each inner electrode layer has a thickness distribution).

This allows efficient distribution of thermal shock and improves resistance to thermal shock.

Also, in both the thermal-shock absorbing portion and the normal multilayer portion, the inner electrode layers have high continuity and have no breaks. Therefore, for example, when the multilayer ceramic electronic component is a multilayer ceramic capacitor, a high-performance multilayer ceramic electronic component having a small size and a large electrostatic capacity can be obtained.

DETAILED DESCRIPTION OF THE PREFERRED EMBODIMENTS

Features of the present invention will now be further described in detail by way of embodiments of the present invention.

Figure 1:
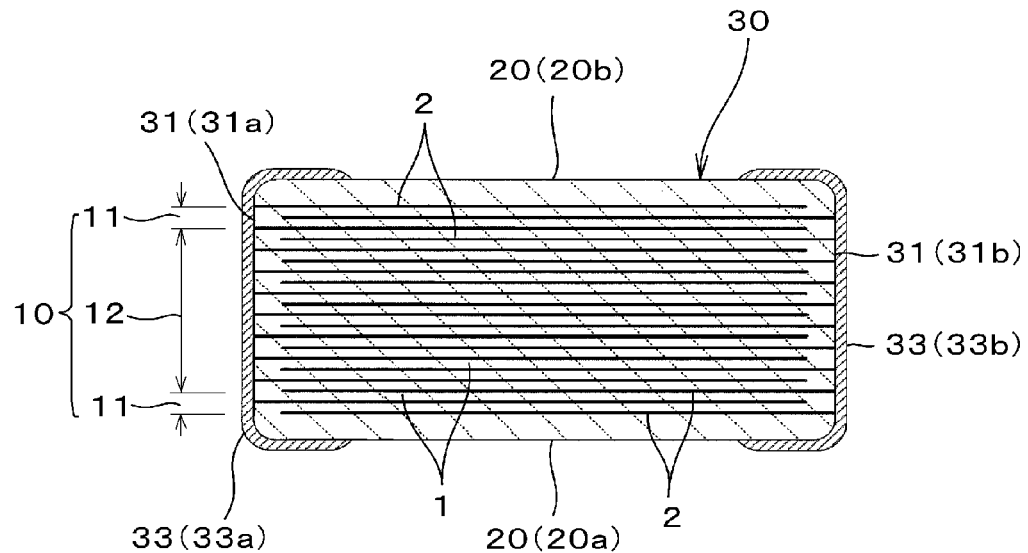
FIG. 1 is a cross-sectional view of a multilayer ceramic electronic component (multilayer ceramic capacitor) according to an embodiment of the present invention.
Figure 2:
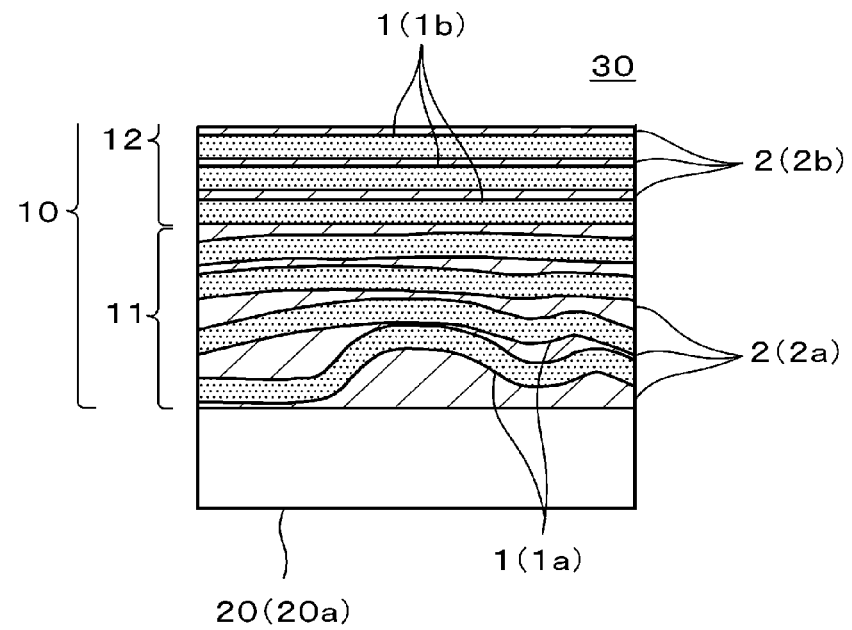
FIG. 2 is an enlarged view of a main part of the multilayer ceramic capacitor according to the embodiment of the present invention.

FIG. 1 is a cross-sectional view illustrating a configuration of a multilayer ceramic electronic component (chip-type multilayer ceramic capacitor) according to an embodiment of the present invention, and FIG. 2 is an enlarged view of a main part of the multilayer ceramic capacitor.

As illustrated in FIGS. 1 and 2, the multilayer ceramic capacitor includes a multilayer portion 10 having a plurality of stacked ceramic layers 1 and inner electrode layers 2 each interposed between adjacent ceramic layers 1, and an outer layer portion 20 (20a, 20b) having no inner electrode layers, formed by one or more ceramic layers, and disposed such that the multilayer portion 10 is sandwiched from directions along the stacking direction.

End portions of the inner electrodes 2 are exposed to a pair of end faces 31 (31a, 31b) of a multilayer body 30 including the multilayer portion 10 and the outer layer portion 20 described above. A pair of outer electrodes 33 (33a, 33b) are disposed to be electrically continuous with these inner electrodes 2.

As illustrated in FIG. 2, in the multilayer portion 10, an outer layer portion adjacent region including an area in contact with the outer layer portion 20 forms a thermal-shock absorbing portion 11. The thermal-shock absorbing portion 11 includes curved ceramic layers 1 (1a) and inner electrode layers 2 (2a) that smoothly vary in thickness from point to point in a direction along the principal surface of the outer layer portion 20.

Also as illustrated in FIG. 2, in the multilayer portion 10, a region to an inside of the thermal-shock absorbing portion 11 forms a normal multilayer portion 12. The normal multilayer portion 12 includes ceramic layers 1 (1b) with less curvature than the ceramic layers 1 (1a) in the thermal-shock absorbing portion 11, and inner electrode layers 2 (2b) with less variation in thickness from point to point in the direction along the principal surface of the outer layer portion 20 than the inner electrode layers 2 (2a) in the thermal-shock absorbing portion 11.

The CV (coefficient of variation) value of the thickness of any of the ceramic layers 1 (1a) in the thermal-shock absorbing portion 11 is 15% or less.

The CV of the thickness of at least one of the inner electrode layers 2 (2a) in the thermal-shock absorbing portion 11 is 40% or more.

The CV of the center-to-center distance between any pair of adjacent ceramic layers 2 (2a) in the thermal-shock absorbing portion 11 is 40% or more. The center-to-center distance is the length of a straight line connecting points along the stacking direction of the multilayer portion 10, the points being located at respective centers of one and the other of the adjacent ceramic layers 2 (2a) in the thickness direction.

The CV of the thickness of any of the ceramic layers 1 (1b) in the normal multilayer portion 12 is 15% or less.

The CV of the thickness of any of the inner electrode layers 2 (2b) in the normal multilayer portion 12 is 20% or less.

The CV of the center-to-center distance between any pair of adjacent ceramic layers 1 (1b) in the normal multilayer portion 12 is 20% or less. The center-to-center distance is the length of a straight line connecting points along the stacking direction of the multilayer portion 10, the points being located at respective centers of one and the other of the adjacent ceramic layers 1 (1b) in the thickness direction.

The multilayer ceramic capacitor according to the embodiment of the present invention configured as described above includes the thermal-shock absorbing portion 11 in which (1) the ceramic layers 1 (1a) are curved and (2) each of the inner electrode layers 2 (2a) smoothly varies in thickness from point to point in the direction along the principal surface of the outer layer portion 20 (i.e., each inner electrode layer 2 (2a) has a thickness distribution). This allows efficient distribution of thermal shock and improves resistance to thermal shock.

It is particularly preferable that the ceramic layers 1 (1a) be irregularly or randomly curved and the thickness of each inner electrode vary in an irregular or random manner, because more efficient distribution of thermal shock is possible.

The inner electrode layers 2 (2b) in the normal multilayer portion 12 and the inner electrode layers 2 (2a) in the thermal-shock absorbing portion 11 both have no breaks in the inner electrodes 2 and their continuity is ensured. Therefore, a large electrostatic capacity can be achieved with a small-size capacitor.

Additionally, since the ceramic layers 1 (1b) and the inner electrode layers 2 (2b) in the normal multilayer portion 12 and the center-to-center distances are adjusted as described above, it is possible to reliably provide a multilayer ceramic electronic component having desired characteristics.

A method for determining the following (a) to (c) in the thermal-shock absorbing portion 11 will be described later:
(a) CV of the thickness of each ceramic layer 1 (1a);
(b) CV of the thickness of each inner electrode layer 2 (2a); and
(c) CV of the center-to-center distance between a pair of adjacent ceramic layers 1 (1a).

A method for determining the following (a') to (c') in the normal multilayer portion 12 will also be described later:
(a') CV of the thickness of each ceramic layer 1 (1b);
(b') CV of the thickness of each inner electrode layer 2 (2b); and
(c') CV of the center-to-center distance between a pair of adjacent ceramic layers 1 (1b).

<1> Pre-Processing of Sample for Thickness Measurement of Ceramic Layer and Inner Electrode Layer A multilayer ceramic capacitor, which is a sample, is encapsulated in resin and polished (which is hereinafter simply referred to as "resin encapsulation polishing"). This allows exposure of a polished end face obtained by polishing a surface (LT surface) of the element of the multilayer ceramic capacitor, the LT surface being parallel to the height direction (stacking direction) and the length direction.

Alternatively, the thickness measurement may be performed on a surface (WT surface) of the element of the multilayer ceramic capacitor, the WT surface being parallel to the height direction (stacking direction) and the width direction.

At the same time, a 0.5 mol % $FeCl_3$ aqueous solution (ferric chloride aqueous solution) is prepared.

Then, the multilayer ceramic capacitor that has been subjected to resin encapsulation polishing is immersed in the ferric chloride aqueous solution for 30 seconds to allow elution of inner electrode layers (Ni electrode layers) exposed to the polished end face (chemical etching).

The elution of the inner electrode layers makes the polished end face concave, so that the interfaces between the inner electrode layers and the ceramic layers become clear.

The chemically-etched polished end face of the multilayer ceramic capacitor is subjected to SEM observation, and a 3000 to 5000 times magnified SEM image of the end face is obtained.

Next, the following measurement is performed using the obtained SEM image.

<2> Measurement of Thickness of Ceramic Layer

Figure 3:
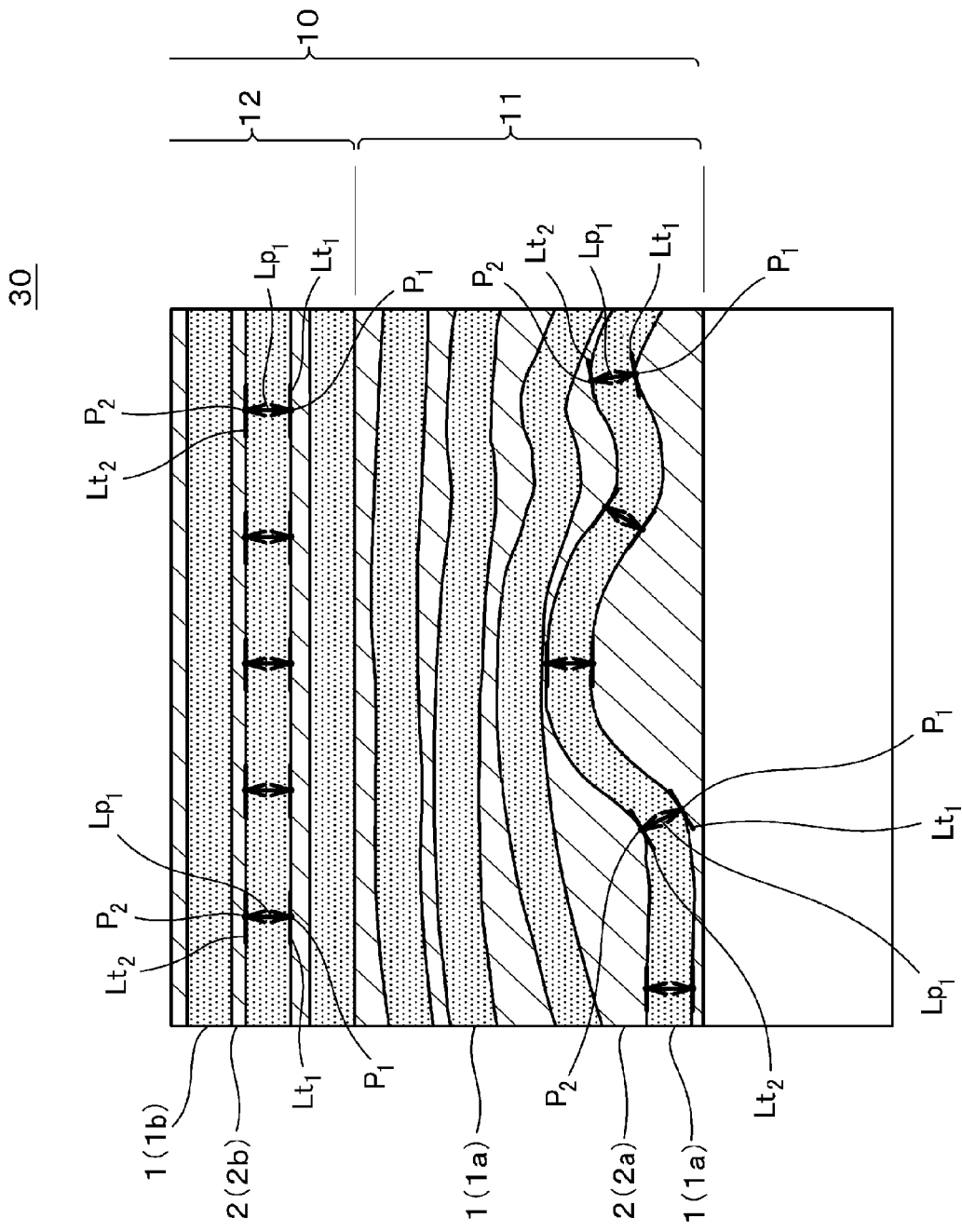
FIG. 3 illustrates how to measure the thickness of a ceramic layer in the multilayer ceramic capacitor according to the embodiment of the present invention.

A method for measuring the thickness of a ceramic layer will now be described with reference to FIG. 3.

Points $P_1$ are appropriately determined at the interfaces between the ceramic layers 1 (1a, 1b) and the inner electrode layers 2 (2a, 2b), and a tangent line $Lt_2$ to the corresponding ceramic layer is drawn at each of the points $P_1$. A perpendicular line $Lp_2$ is drawn from the tangent line $Lt_2$ to a face (interface) on the opposite side of the ceramic layer 1 to determine an intersection point $P_2$ with the interface. A line $Lt_2$ passing through the intersection point $P_2$ is drawn parallel to the initial tangent line $Lt_2$. The distance between the two parallel straight lines $Lt_2$ and $Lt_2$ is measured to determine the thickness of the ceramic layer.

For both the curved ceramic layers 1 (1a) in the thermal-shock absorbing portion 11 and the ceramic layers 1 (1b) in the normal multilayer portion 12, the ceramic layers 1 (1b) having less curvature than the ceramic layers 1 (1a) in the thermal-shock absorbing portion 11, the measurement is made at 20 points for each ceramic layer.

Then, the mean value of the thicknesses of the ceramic layers, the standard deviation, and the CV (coefficient of variation) ((standard deviation/mean value)×100(%)) are determined from the measurement data.

For both the curved ceramic layers 1 (1a) in the thermal-shock absorbing portion 11 and the ceramic layers 1 (1b) in the normal multilayer portion 12, the measurement is performed on three ceramic layers and the highest CV is determined.

<3> Measurement of Thickness of Inner Electrode Layer

Figure 4:
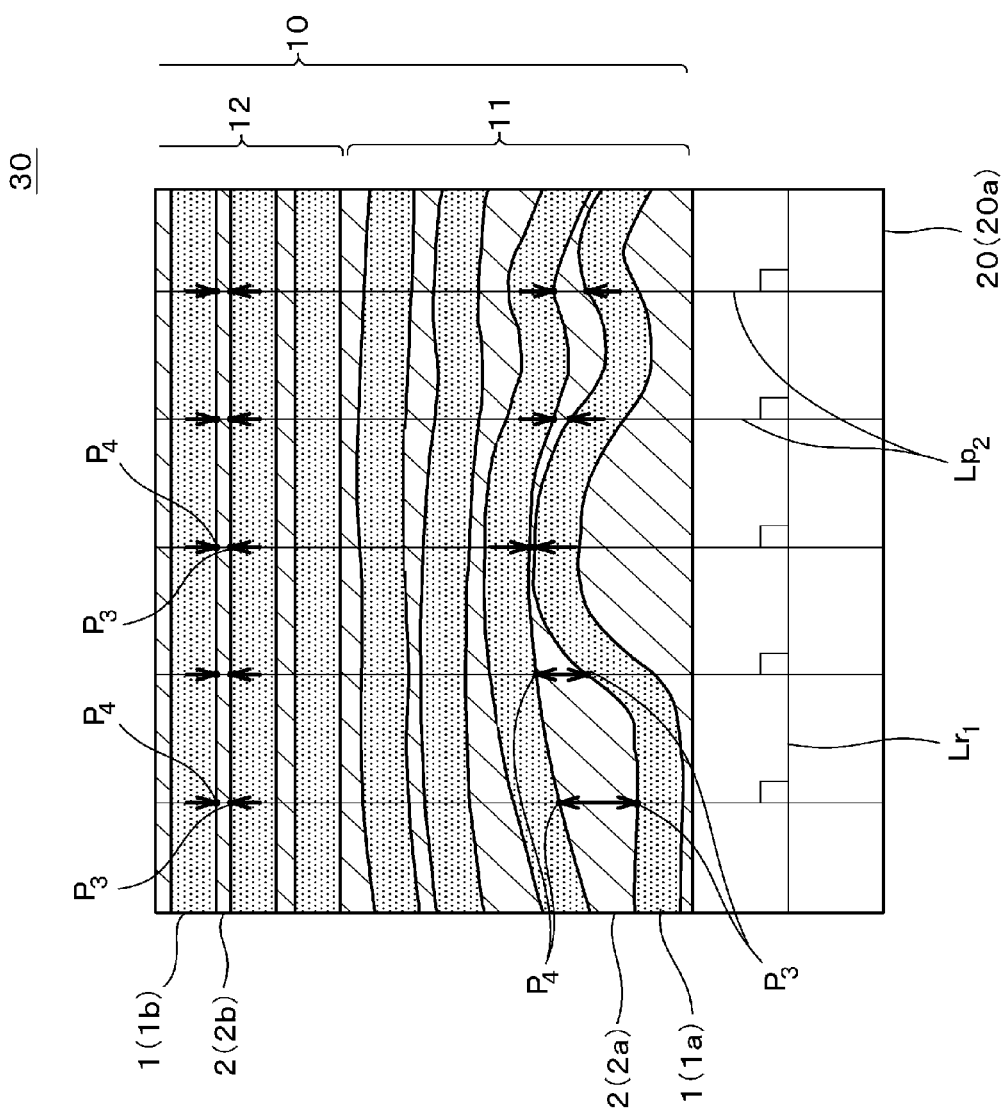
FIG. 4 illustrates how to measure the thickness of an inner electrode layer in the multilayer ceramic capacitor according to the embodiment of the present invention.

A method for measuring the thickness of an inner electrode layer will now be described with reference to FIG. 4.

A reference line $Lr_1$ is drawn (at any position) substantially parallel to the inner electrode layers 2 (2a) in the normal multilayer portion 12, the inner electrode layers 2 (2a) being the inner electrode layers 2 with less variation in thickness from point to point in the direction along the principal surface of the outer layer portion. Although the reference line $Lr_1$ is drawn in the outer layer portion 20 (20a) in FIG. 4, the reference line $Lr_1$ may be drawn in the multilayer portion 10 because the outer layer portion 20 may not be included in one field of view of the SEM image.

Then, perpendicular lines $Lp_2$ are drawn to the reference line $Lr_1$. The length of a straight line connecting an intersection point $P_3$ and an intersection point $P_4$ on each perpendicular line $Lp_2$ (i.e., the distance between $P_3$ and $P_4$) is measured as a thickness of each of the inner electrode layers 2 (2a, 2b). The intersection point $P_3$ is a point of intersection of one principal surface of each of the inner electrode layers 2 (2a, 2b) with the corresponding perpendicular line $Lp_2$, and the intersection point $P_4$ is a point of intersection of the other principal surface of the inner electrode layer 2 with the perpendicular line $Lp_2$.

For both the inner electrode layers 2 (2a) smoothly varying in thickness in the thermal-shock absorbing portion 11 and the inner electrode layers 2 (2b) in the normal multilayer portion 12, the inner electrode layers 2 (2b) having less variation in thickness than the inner electrode layers 2 (2a) in the thermal-shock absorbing portion 11, the measurement is made at 20 points for each of the inner electrode layers 2 (2a, 2b).

Then, the mean value of the thicknesses of the inner electrode layers 2 (2a, 2b), the standard deviation, and the CV ((standard deviation/mean value)×100(%)) are determined from the measurement data.

For both the inner electrode layers 2 (2a) in the thermal-shock absorbing portion 11 and the inner electrode layers 2 (2b) in the normal multilayer portion 12, the measurement is performed on three inner electrode layers 2 (2a, 2b).

For the inner electrode layers 2 (2a) in the thermal-shock absorbing portion 11, the highest of the three CVs is determined as the highest CV of the thicknesses of the inner electrode layers 2 (2a) in the thermal-shock absorbing portion 11.

For the inner electrode layers 2 (2b) in the normal multilayer portion 12, the highest of the three CVs is determined as the highest CV of the thicknesses of the inner electrode layers 2 (2b) in the normal multilayer portion 12.

<4> Measurement of Center-to-Center Distance Between Adjacent Ceramic Layers

Figure 5:
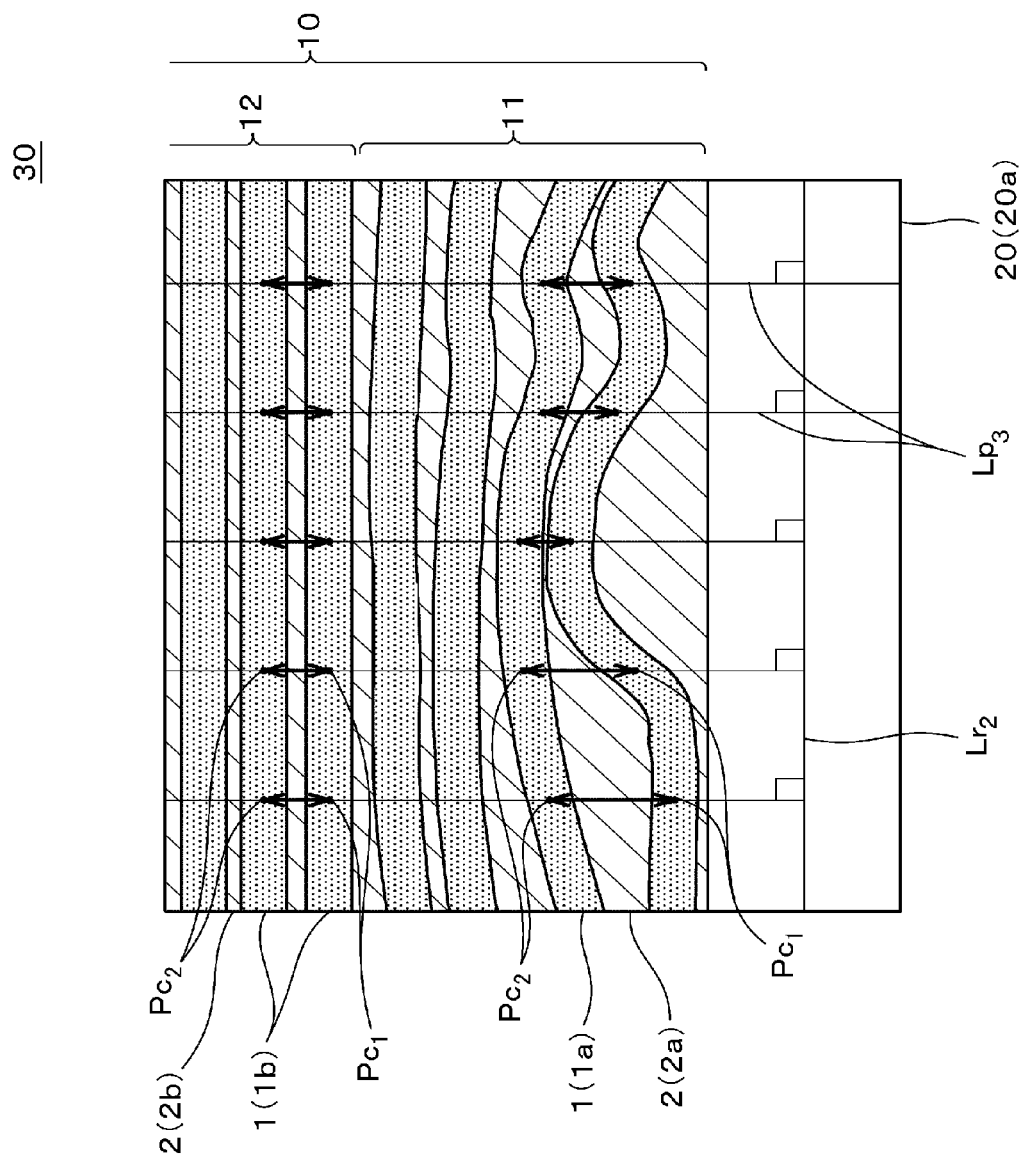
FIG. 5 illustrates how to measure the center-to-center distance between adjacent ceramic layers in the multilayer ceramic capacitor according to the embodiment of the present invention.

A method for measuring a center-to-center distance between two adjacent ceramic layers will now be described with reference to FIG. 5.

A reference line $Lr_2$ is drawn (at any position) substantially parallel to the ceramic layers 1 (1b) in the normal multilayer portion 12. Although the reference line $Lr_2$ is drawn in the outer layer portion 20 (20a) in FIG. 5, the reference line $Lr_2$ may be drawn in the multilayer portion 10 because the outer layer portion 20 may not be included in one field of view of the SEM image.

Then, perpendicular lines $Lp_3$ are drawn to the reference line $Lr_2$.

Next, center points $Pc_1$ and $Pc_2$ of respective two adjacent ceramic layers 1 (1a, 1b) are specified. The center points $Pc_1$ and $Pc_2$ are at the respective centers of the two ceramic layers 11 (1a, 1b) in the thickness direction and are located on each of the perpendicular lines $Lp_3$ described above.

Then, the distance between the two specified center points $Pc_1$ and $Pc_2$ (center-to-center distance) is measured.

For both the curved ceramic layers 1 (1a) in the thermal-shock absorbing portion 11 and the ceramic layers 1 (1b) in the normal multilayer portion 12, the ceramic layers 1 (1b) having less curvature than the ceramic layers 1 (1a) in the thermal-shock absorbing portion 11, the center-to-center distance is measured at 20 points for each pair of adjacent ceramic layers.

Then, the mean value of the center-to-center distances, the standard deviation, and the CV ((standard deviation/mean value)×100(%)) are determined from the measurement data.

For both the curved ceramic layers 1 (1a) in the thermal-shock absorbing portion 11 and the ceramic layers 1 (1b) in the normal multilayer portion 12, the measurement of the center-to-center distance is performed on three pairs of ceramic layers. For the center-to-center distance in the thermal-shock absorbing portion 11, the highest of the three CVs is determined. For the center-to-center distance in the normal multilayer portion 12, the highest of the three CVs is also determined.

<5> Method and Procedure for Determining the States of Thermal-Shock Absorbing Portion and Normal multilayer portion in multilayer ceramic electronic component of the present invention (1) For the thermal-shock absorbing portion, the thicknesses of the curved ceramic layers and the inner electrode layers with smoothly varying thicknesses are measured, and the mean value, the standard deviation, and the CV ((standard deviation/mean value)×100(%)) are determined with the method described above.

(2) Next, for the normal multilayer portion, the thicknesses of the ceramic layers with less curvature and the thicknesses of the inner electrode layers with less variation in thickness from point to point are measured, and the mean value, the standard deviation, and the CV ((standard deviation/mean value)×100(%)) are determined with the method described above.

(3) Because any thickness of ceramic layers and any thickness of inner electrode layers can be selected, the thickness of ceramic layers and the thickness of inner electrode layers are defined by CVs for both the thermal-shock absorbing portion and the normal multilayer portion.

(4) After the thicknesses of the ceramic layers are measured, the center points of the thicknesses can be determined. Thus, with the method described above, for both the thermal-shock absorbing portion and the normal multilayer portion, the center-to-center distances between the thicknesses of adjacent ceramic layers are measured, the mean value and the standard deviation are determined from the obtained measurement data, and the CV is calculated from the standard deviation.

(5) The fact that the CV of the center-to-center distance between the thicknesses of ceramic layers in the normal multilayer portion differs from that in the thermal-shock absorbing portion shows that the ceramic layers in the thermal-shock absorbing portion are curved, and the difference between the CVs indicates the degree (or state) of the curvature.

Also, the fact that the CV of the thickness of the inner electrode layer in the thermal-shock absorbing portion exceeds 20% shows that the thickness of the inner electrode layer varies from point to point in the direction along the principal surface of the outer layer portion, and the fact that the CV of the thickness of the inner electrode layer is 40% or more shows that the inner electrode layer has a sufficient thickness distribution.

The invention of the present application will be specifically described by way of Example.

EXAMPLE

In Example, chip-type multilayer ceramic capacitors were produced as multilayer ceramic electronic components, and the relationship between the sintering temperature rise rate in the sintering process, the structure of the multilayer portion, the occurrence rate of cracks in the thermal shock test, and the electrostatic capacity was examined.

(A) Preparation of Ceramic Base Powder for Ceramic Layers (Dielectric Layers)

Base powder (ceramic base powder) for ceramic layers serving as dielectric layers was prepared in the following procedure.

First, $BaCO_3$ powder and $TiO_2$ powder were weighed such that the ratio of Ba to Ti (Ba/Ti) was 1.001. These powders were wet-ground and mixed in a zirconia ball mill.

After being dried, the powder mixture was heated to 900° C. or more and subjected to heat treatment (calcination), which produced a perovskite-type compound oxide ($BaTiO_3$ ceramic powder) having an average particle diameter of 0.20 µm.

Then 0.6 mol parts of $Dy_2O_3$, 1.2 mol parts of $MgCO_3$, 0.2 mol parts of $MnCO_3$, and 1.0 mol part of $BaCO_3$ were added in a powder form to 100 mol parts of $BaTiO_3$ ceramic powder, and 0.7 mol parts of $SiO_2$ sol expressed in $SiO_2$ equivalent was further added. The resulting material was ground and mixed in a zirconia ball mill to produce a ceramic base powder for ceramic layers (dielectric layers).

(B) Preparation of Ni Paste

Ni powder having an average particle diameter of 0.25 µm, organic vehicle (ethyl cellulose/terpineol=1/9 (ratio by weight)), and terpineol were mixed, and the resulting material was dispersed and mixed in a triple roll mill. Ni paste used to form inner electrode layers was thus produced.

(C) Preparation of Multilayer Ceramic Capacitor (C-1) A polybutyral-based binder and a plasticizer were added to the ceramic base powder produced as described above. Then toluene and ethyl alcohol were added to the resulting material to make it into a slurry in a zirconia ($ZrO_2$) ball mill. The slurry was formed into a 1.9-µm-thick sheet by a gravure coater, so that a ceramic green sheet was obtained.

(C-2) The Ni paste produced as described above was applied onto the ceramic green sheet by screen printing, so as to form a conductive paste pattern which is to serve as an inner electrode (layer).

(C-3) Then 300 ceramic green sheets, each having a conductive paste pattern thereon, were stacked such that sides to which conductive paste patterns were extended were alternately positioned on one side and the other. Next, a predetermined number of ceramic green sheets for the outer layer portion, the ceramic green sheets having no conductive paste patterns (inner electrode layers) thereon, were stacked on both sides of the resulting multilayer structure so that the multilayer structure was sandwiched therebetween. A multilayer block was thus produced.

(C-4) The multilayer block was cut into multilayer bodies (green multilayer chips) such that they each were 2.0 mm in length (L) and 1.25 mm in width (W) after being densified by sintering.

The obtained green multilayer chips were heated to 280° C. in an $N_2$ stream to burn off the binder. The green multilayer chips were then heated continuously in an $N_2$—$H_2$—$H_2O$ stream until a concentration equivalent to 1000 ppm or less of carbon was reached, so that the binder was fully burned out.

(C-5) Next, by performing sintering in $N_2$ under the conditions of an average temperature rise rate of 40° C./second, a maximum temperature of 1220° C., and a holding time of 10 seconds, a sintered multilayer body (multilayer ceramic capacitor element) was obtained.

(C-6) Then, a conductive paste mainly composed of copper was applied to end faces of the multilayer body to which inner electrode layers were extended. The applied paste was baked at 800° to form outer electrodes. Additionally, a Ni film and a Sn film were sequentially formed by wet plating on the surface of each outer electrode.

Thus, a multilayer ceramic capacitor such as that illustrated in FIGS. 1 and 2 was obtained. As illustrated, the multilayer ceramic capacitor has the multilayer body 30 that includes the multilayer portion 10 having the stacked ceramic layers 1 and the inner electrode layers 2 each interposed between adjacent ceramic layers 1, and the outer layer portion 20 (20a, 20b) formed by ceramic layers and disposed such that the multilayer portion 10 is sandwiched. The pair of outer electrodes 33 (33a, 33b) is disposed on the pair of end faces 31 (31a, 31b) of the multilayer body 30 to be electrically continuous with the inner electrodes 2.

The thickness (element thickness) of the ceramic layers (dielectric layers) of the obtained multilayer ceramic capacitor was 1.6 µm.

In Example, the multilayer ceramic capacitor was produced by sintering under the condition of an average temperature rise rate of 40° C./second (Condition 1). Multilayer ceramic capacitors were also produced by sintering under the following Conditions 2 to 5:

average temperature rise rate: 100° C./second (Condition 2);

average temperature rise rate: 270° C./second (Condition 3);

average temperature rise rate: 5° C./second (Condition 4); and average temperature rise rate: 0.17° C./second (Condition 5).

These multilayer ceramic capacitors (Conditions 2 to 5) were produced under the same conditions as those in the case of Condition 1, except that they were sintered at different average temperature rise rates as described above.

(D) Characteristic Evaluation

For each of the multilayer ceramic capacitors produced under Conditions 1 to 5, resin encapsulation polishing was performed on 100 samples, so that the end faces (LT end faces) of the multilayer ceramic capacitors were exposed as polished end faces. The polished end faces were observed under a metallurgical microscope to examine the state of ceramic layers and inner electrode layers in a region extending from the outer layer to the center of the multilayer portion.

Also, for each of the multilayer ceramic capacitors, 100 multilayer ceramic capacitors were subjected to a thermal shock test which involved immersion in a solder bath of 325° C. for two seconds. Then, the multilayer ceramic capacitors were examined for cracks by metallurgical microscopic observation.

Also, for each of the multilayer ceramic capacitors, the electrostatic capacities of 100 samples were measured under the conditions of 120 Hz and 0.5 Vrms using an LCR meter.

Figure 6:
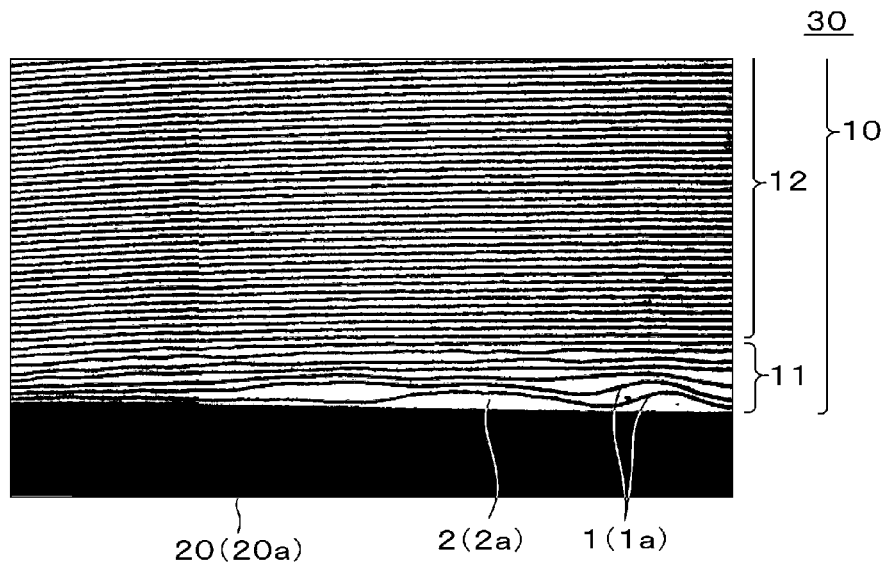
FIG. 6 shows a metallurgical micrograph of a cross section (LT cross section) exposed by performing resin encapsulation polishing on a multilayer ceramic capacitor (sample of Example) produced under Condition 1 in Example of the present invention.

FIG. 6 shows a metallurgical micrograph of a polished end face (LT end face) exposed by performing resin encapsulation polishing on the multilayer ceramic capacitor produced under Condition 1 (average temperature rise rate=40° C./second).

Table 1 shows the following (a) to (h) determined for the multilayer ceramic capacitors produced under Conditions 1 to 5:

(a) (highest) CV of the thicknesses of the ceramic layers 1 (1a) in the thermal-shock absorbing portion 11;

(b) (highest) CV of the thicknesses of the inner electrode layers 2 (2a) in the thermal-shock absorbing portion 11;

(c) (highest) CV of the center-to-center distances between pairs of adjacent ceramic layers 1 (1a) in the thermal-shock absorbing portion 11;

(d) (highest) CV of the thicknesses of the ceramic layers 1 (1b) in the normal multilayer portion 12;

(e) (highest) CV of the thicknesses of the inner electrode layers 2 (2b) in the normal multilayer portion 12;

(f) (highest) CV of the center-to-center distances between pairs of adjacent ceramic layers 1 (1b) in the normal multilayer portion 12;

(g) occurrence rate of cracks in a thermal shock test; and (h) electrostatic capacity.

That is, in the multilayer ceramic capacitor produced under Condition 1, as can also be seen in FIG. 6 and FIGS. 2 to 5, an outer layer portion adjacent region including an area in contact with the outer layer portion 20 forms the thermal-shock absorbing portion 11 which includes the curved ceramic layers 1 (1a) and the inner electrode layers 2 (2a) smoothly varying in thickness from point to point in the direction along the principal surface of the outer layer portion 20, and a region to an inside of the thermal-shock absorbing portion 11 forms the normal multilayer portion 12 which includes the inner electrode layers 2 (2b) with less variation in thickness from point to point in the direction along the principal surface of the outer layer portion 20 than the inner electrode layers 2 (2a) in the thermal-shock absorbing portion 11. The inner electrode layers 2 (2a, 2b) have no breaks and have high continuity.

Thus, as shown in Table 1, it was found that the multilayer ceramic capacitor produced under Condition 1 has good resistance to thermal shock, shows no cracks in the thermal shock test, and has a large electrostatic capacity.

In the multilayer ceramic capacitor produced under Condition 1, as can be seen in the metallurgical micrograph of FIG. 6 and FIGS. 2 to 5, the ceramic layers 1 (1a) in the thermal-shock absorbing portion 11 are irregularly or randomly curved and the thicknesses of the inner electrode layers 2 (2a) in the thermal-shock absorbing portion 11 vary in an irregular or random manner. This indicates that higher resistance to thermal shock is achieved.

Also, in the multilayer ceramic capacitor produced under Condition 2 in which the average temperature rise rate in the

TABLE 1

| | | Thermal-Shock Absorbing Portion | | | Normal Multilayer Portion | | | | |
|---|---|---|---|---|---|---|---|---|---|
| | Temperature Rise Rate (° C./second) | Highest CV of Thicknesses of Ceramic Layers (%) | Highest CV of Thicknesses of Inner Electrode Layers (%) | Highest CV of Center-to-Center Distances between Adjacent Ceramic Layers (%) | Highest CV of Thicknesses of Ceramic Layers (%) | Highest CV of Thicknesses of Inner Electrode Layers (%) | Highest CV of Center-to-Center Distances between Adjacent Ceramic Layers (%) | Crack Occurrence Rate in Thermal Shock Test (%) | Electrostatic Capacity (μF) |
| Condition 1 | 40 | 15 | 45 | 46 | 15 | 20 | 20 | 0 | 10.3 |
| Condition 2 | 100 | 14 | 53 | 55 | 11 | 17 | 18 | 0 | 10.5 |
| Condition 3 | 270 | 13 | 40 | 40 | 10 | 15 | 17 | 0 | 10.0 |
| Condition 4* | 5 | 19 | 23 | 25 | 15 | 18 | 20 | 10 | 9.5 |
| Condition 5* | 0.17 | 15 | 20 | 20 | 15 | 20 | 27 | 45 | 8.1 |

Conditions marked with * represent Comparative Example not meeting the requirements of the present invention, and the others represent Example meeting the requirements of the present invention.

The multilayer ceramic capacitor produced under Condition 1 in Table 1 is a multilayer ceramic capacitor produced through the process of sintering at a temperature rise rate of 40° C./second.

As shown in Table 1, the (highest) CV of the thicknesses of the ceramic layers 1 (1a) in the thermal-shock absorbing portion 11 is 15%, the (highest) CV of the thicknesses of the inner electrode layers in the thermal-shock absorbing portion 11 is 45%, and the (highest) CV of the center-to-center distances between pairs of adjacent ceramic layers 1 (1a) in the thermal-shock absorbing portion 11 is 46%.

Also, the (highest) CV of the thicknesses of the ceramic layers 1 (1b) in the normal multilayer portion 12 is 15%, (highest) CV of the thicknesses of the inner electrode layers 2 (2b) in the normal multilayer portion 12 is 20%, and the (highest) CV of the center-to-center distances between pairs of adjacent ceramic layers 1 (1b) in the normal multilayer portion 12 is 20%.

sintering process was 100° C./second and the multilayer ceramic capacitor produced under Condition 3 in which the average temperature rise rate in the sintering process was 270° C./second, it was found, as shown in Table 1, that the ceramic layers and the inner electrode layers in both the thermal-shock absorbing portion and the normal multilayer portion satisfy the requirements of the present invention. It was also found that, like the multilayer ceramic capacitor produced under Condition 1, the multilayer ceramic capacitors produced under Conditions 2 and 3 are highly resistant to thermal shock, show no cracks in the thermal shock test, and have large electrostatic capacities.

On the other hand, in the multilayer ceramic capacitor produced under Condition 4 in which the average temperature rise rate in the sintering process was 5° C./second and the multilayer ceramic capacitor produced under Condition 5 in which the average temperature rise rate in the sintering process was 0.17° C./second, it was found, as shown in Table 1, that the requirements of the present invention are not satisfied in some of the (highest) CV of the thicknesses of the ceramic layers in the thermal-shock absorbing portion, the (highest) CV of the thicknesses of the inner electrode layers in the thermal-shock absorbing portion, and the (highest) CV of the center-to-center distances between pairs of adjacent ceramic layers in the thermal-shock absorbing portion. It was also found that the multilayer ceramic capacitors produced under Conditions 4 and 5 have small electrostatic capacities and show cracks in the thermal shock test. Breaks in the inner electrode layers and the occurrence of cracks are both considered to be the causes of the small electrostatic capacities of the multilayer ceramic capacitors produced under Conditions 4 and 5.

Figure 7:
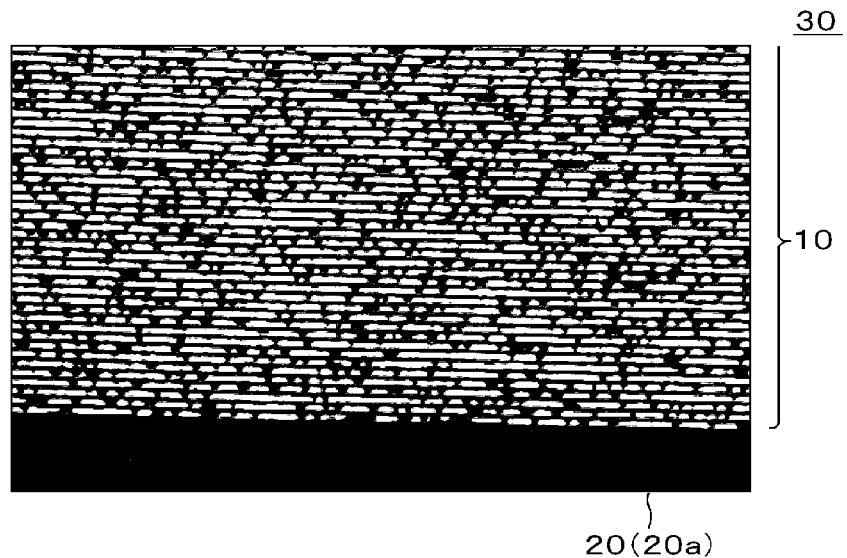
FIG. 7 shows a metallurgical micrograph of a cross section (LT cross section) exposed by performing resin encapsulation polishing on a multilayer ceramic capacitor (sample of Comparative Example) produced under Condition 5 in Example of the present invention.
Figure 8:
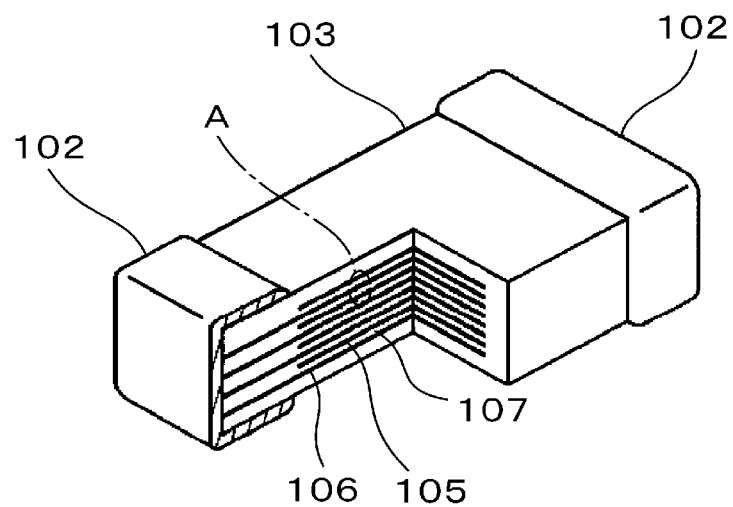
FIG. 8 is a partial cutaway perspective view of a conventional multilayer ceramic capacitor.
Figure 9:
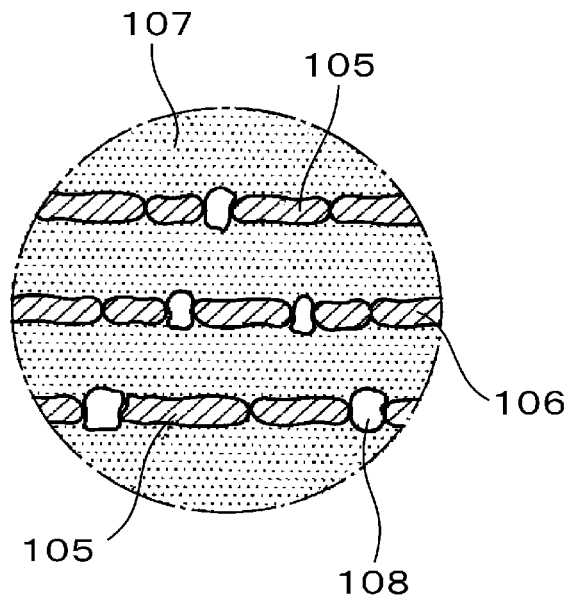
FIG. 9 is a main-part enlarged cross-sectional view of part A of the multilayer ceramic capacitor illustrated in FIG. 7.

FIG. 7 shows a metallurgical micrograph of a polished end face (LT end face) exposed by performing resin encapsulation polishing on the multilayer ceramic capacitor produced under Condition 5 (average temperature rise rate=0.17° C./second).

FIG. 7 shows that the multilayer ceramic capacitor produced under Condition 4 does not have the thermal-shock absorbing portion 11, which is in the multilayer ceramic capacitor produced under Condition 1 (see FIG. 6), and that the inner electrode layers in the multilayer portion 10 have breaks.

Multilayer ceramic capacitors have been described in the embodiments and Example. The present invention is applicable not only to multilayer ceramic capacitors, but also to various multilayer ceramic electronic components having a plurality of stacked ceramic layers and inner electrode layers each interposed between adjacent ceramic layers, such as multilayer LC composite components and multilayer varistors.

The present invention is not limited to the embodiments and Example in other aspects, and various modifications and applications of the present invention are possible within the scope of the invention, for example, in terms of the materials and the number of stacked layers of the ceramic layers and the inner electrode layers, and the materials and arrangement of the inner electrodes and the outer electrodes.

REFERENCE SIGNS LIST 1 (1a, 1b): ceramic layer
2 (2a, 2b): inner electrode layer
10: multilayer portion
11: thermal-shock absorbing portion
12: normal multilayer portion
20 (20a, 20b): outer layer portion
30: multilayer body
31 (31a, 31b): end face of multilayer body
33 (33a, 33b): outer electrode
$P_1$: point at interface between ceramic layer and inner electrode layer
$P_2$: point at interface between the other side of ceramic layer and inner electrode layer
$P_3$: intersection point of one principal surface of inner electrode layer and perpendicular line $Lp_2$
$P_4$: intersection point of the other principal surface of inner electrode layer and perpendicular line $Lp_2$
$Pc_1$, $Pc_2$: center point
$Lt_1$: tangent line drawn to ceramic layer
$Lt_2$: line parallel to tangent line $Lt_1$
$Lp_1$: perpendicular line drawn to tangent line $Lt_1$
$Lp_2$: perpendicular line drawn to reference line $Lr_1$
$Lp_3$: perpendicular line drawn to reference line $Lr_2$
$Lr_1$, $Lr_2$: reference line

The invention claimed is:

1. A multilayer ceramic electronic component comprising:
an outer layer portion having one or more ceramic layers;
a thermal-shock absorbing portion in contact with the outer layer portion and that includes curved ceramic layers and inner electrode layers varying in thickness from point to point in a direction along a principal surface of the outer layer portion; and
a normal multilayer portion that includes ceramic layers with less curvature than the curved ceramic layers in the thermal-shock absorbing portion and inner electrode layers with less variation in thickness from point to point in the direction along the principal surface of the outer layer portion than the inner electrode layers in the thermal-shock absorbing portion.

2. The multilayer ceramic electronic component according to claim 1, wherein, in the thermal-shock absorbing portion, a coefficient of variation of a thickness of any of the curved ceramic layers is 15% or less.

3. The multilayer ceramic electronic component according to claim 1, wherein, in the thermal-shock absorbing portion, a coefficient of variation of a thickness of at least one of the inner electrode layers is 40% or more.

4. The multilayer ceramic electronic component according to claim 1, wherein, in the thermal-shock absorbing portion, a coefficient of variation of a center-to-center distance between any pair of adjacent curved ceramic layers is 40% or more.

5. The multilayer ceramic electronic component according to claim 1, wherein, in the thermal-shock absorbing portion,
a coefficient of variation of a thickness of any of the curved ceramic layers is 15% or less,
a coefficient of variation of a thickness of at least one of the inner electrode layers is 40% or more, and
a coefficient of variation of a center-to-center distance between any pair of adjacent curved ceramic layers is 40% or more.

6. The multilayer ceramic electronic component according to claim 5, wherein, in the normal multilayer portion,
a coefficient of variation of a thickness of any of the ceramic layers is 15% or less,
a coefficient of variation of a thickness of any of the inner electrode layers is 20% or less, and
a coefficient of variation of a center-to-center distance between any pair of adjacent ceramic layers is 20% or less.

7. The multilayer ceramic electronic component according to claim 1, wherein, in the normal multilayer portion, a coefficient of variation of a thickness of any of the ceramic layers is 15% or less.

8. The multilayer ceramic electronic component according to claim 1, wherein, in the normal multilayer portion, a coefficient of variation of a thickness of any of the inner electrode layers is 20% or less.

9. The multilayer ceramic electronic component according to claim 1, wherein, in the normal multilayer portion, a coefficient of variation of a center-to-center distance between any pair of adjacent ceramic layers is 20% or less.

10. The multilayer ceramic electronic component according to claim 1, wherein in the normal multilayer portion,
a coefficient of variation of a thickness of any of the ceramic layers is 15% or less,
a coefficient of variation of a thickness of any of the inner electrode layers is 20% or less, and a coefficient of variation of a center-to-center distance between any pair of adjacent ceramic layers is 20% or less.

11. The multilayer ceramic electronic component according to claim 1, wherein the curved ceramic layers are irregularly curved.

12. The multilayer ceramic electronic component according to claim 11, wherein the thickness of each inner electrode varies in an irregular manner.

13. The multilayer ceramic electronic component according to claim 1, wherein the thickness of each inner electrode varies in an irregular manner.

14. The multilayer ceramic electronic component according to claim 1, wherein the inner electrode layers in the normal multilayer portion and the inner electrode layers in the thermal-shock absorbing portion have no breaks.

15. The multilayer ceramic electronic component according to claim 1, wherein the multilayer ceramic electronic component is a surface-mount multilayer ceramic capacitor.

* * * * *